United States Patent [19]

Müller et al.

[11] 4,046,789

[45] Sept. 6, 1977

[54] PROCESS FOR THE SEPARATION OF WASTE PRODUCTS OF THE FOOD INDUSTRY

[75] Inventors: Hans Müller, Erlenbach; Louis Grob, Zurich, both of Switzerland

[73] Assignee: Chemap AG, Mannedorf, Switzerland

[21] Appl. No.: 636,946

[22] Filed: Dec. 2, 1975

[30] Foreign Application Priority Data

Dec. 3, 1974 Switzerland ............... 16286/74
Jan. 31, 1975 Switzerland ............... 1286/75
Aug. 22, 1975 Switzerland ............... 11011/75

[51] Int. Cl.² .................. C11B 13/00; A23J 1/18; C13D 1/14
[52] U.S. Cl. ............... 260/412.8; 127/43; 195/27; 195/28 R; 195/31 F; 426/417; 426/425; 426/429; 426/478
[58] Field of Search ........... 195/27, 31 F, 28 R; 426/417, 425, 429, 430, 478, 479, 481; 127/67, 43; 260/412.8

[56] References Cited

U.S. PATENT DOCUMENTS

| 2,943,004 | 6/1960 | Haury | 127/43 X |
| 3,105,799 | 10/1963 | Tveit | 195/82 |
| 3,720,583 | 3/1973 | Fisher | 195/31 R |
| 3,939,281 | 2/1976 | Schwengers | 426/417 |

OTHER PUBLICATIONS

Michaels, "Ultrafiltration" Booklet No. 905, Amicon Corporation, Mar. 1968, p. 22.

Primary Examiner—Lionel M. Shapiro
Attorney, Agent, or Firm—Michael J. Striker

[57] ABSTRACT

Bakery-type wastes as they occur in the food industry and which contain substantial amounts of fats, sugar, proteins and starch are recovered by removing the fat- and oil-component from the waste by a solvent extraction-filtration step followed by recovery of the sugar and starch protein mixture for reuse in the industry.

6 Claims, 1 Drawing Figure

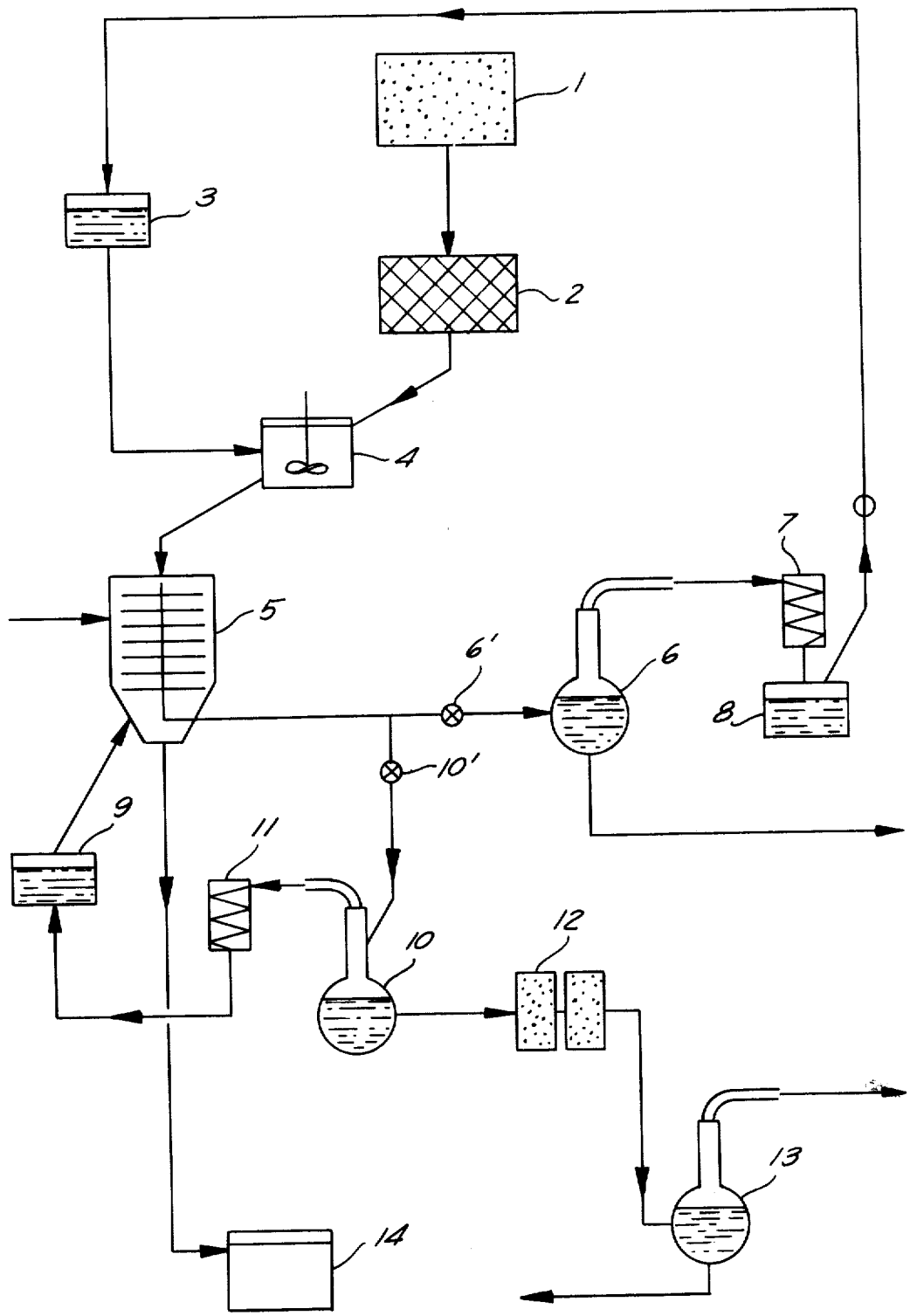

PROCESS FOR THE SEPARATION OF WASTE PRODUCTS OF THE FOOD INDUSTRY

BACKGROUND OF THE INVENTION

The invention relates to a process for separating waste products as they occur in the food industry and for recovery therefrom of proteins, starch, fats and sugar and for converting the individual components into reuseable components of food products.

In the production of food products of the cereal type large amounts of waste products occur which are used exclusively as animal feeds of low value. For intance, when making cookies, crackers or biscuits, large amounts of bakery wastes are obtained during the manufacture. In making flour and other grain products, for instance bran is obtained as a waste product. These wastes contain fats, proteins and carbohydrates in the form of flour, starch and sugar in various proportions.

Numerous attempts have been made to reprocess these materials for use in food products. However, impurities put a limit on this type of reuse.

A process is known by which starch is opened up by microbiological means and subsequently converted into microbiological protein (see U.S. Pat. No. 3,105,799). This process is concerned with starch-containing refuse waters, for instance from the potato processing industry. The proteins obtained are suitable as animal feed. However, in the waste products a large proportion of high value protein useful for human consumption is also contained. This portion of the protein has so far not been given any consideration.

Processes are also known by which protein can be obtained through an ultrafiltration. This type of process used is mainly in the dairy sector for instance, in order to obtain protein whey.

It is therefore an object of the present invention to recover the individual components from these waste products and reprocess them for use in valuable food products.

A particular object is to obtain high value proteins from the waste products.

SUMMARY OF THE INVENTION

The waste products which contain substantial amounts of fats, sugars, proteins and starch are processed by removing the fat- and oil-component from the waste by a solvent extraction-filtration step followed by recovery of the sugar and the starch-protein mixture for reuse in food products which recovery may be effected in separate process steps for the sugar portion and the starch-protein portion.

BRIEF DESCRIPTION OF THE DRAWING

The drawing shows in diagrammatic manner the different process steps of the invention.

DISCUSSION OF THE INVENTION AND DESCRIPTION OF PREFERRED EMBODIMENTS

With reference to the drawing it will be noted that the waste products e.g. from biscuits are indicated by the reference numeral 1. They are first subjected to a comminution in the vessel 2. The comminuted material is then mixed in a mixing vessel 4 with a solvent which for instance may be hexane obtained from the storage vessel 3. The mixture of waste product and solvent is then subjected to a solvent extraction and subsequent filtration in one and the same vessel 5. Between successive extraction steps the solvent is blown out with steam (see the arrow at left of the vessel 5) and is passed through a valve 6′to a regeneration vessel 6. The main product obtained in the extraction and filtration step, the solvent-oil mixture is likewise subjected to the distillation indicated as 6. The recovered solvent is then passed from the top of the distillation device to a condensor 7 and from there to a temporary storage vessel 8 from which it is passed back into the solvent storage vessel 3 and further is recycled in the process as indicated. The oil-fat mixture itself is drawn from the bottom of the distillation and subjected to a refinement step.

In a second extraction step the sugar remaining in the filtration-extraction device 5 is extracted for instance with an alcoholic solution 9 of a 70% concentration. After this extraction step is complete the filter cake is subjected to a steam extraction from the alcohol (see again the arrow left of the frame 5).

The sugar-alcohol solution then is passed by the valve 10′ into the separation device 10 where the alcohol is distilled off and recycled, after passing a condenser 11, into the alcohol storage vessel 9. The aqueous solution which is now free of alcohol then is passed for instance to an ion exchanger 12 in order to separate the salt present which mainly is sodium chloride salt. The salt-free sugar solution is then further processed in vessel 13 to obtain sugar, particularly saccharose.

The filter residue in this case will still contain mainly starch. It is subjected to a regeneration and after recovery to a fermentation indicated at 14.

For instance the starch containing residue may first be subject to a hydrolysis and subsequent to an aerobic fermentation. The starch-containing material can also be subjected to a fermentation without prior hydrolysis, the fermentation being carried out for instance in a symbiotic process where two different microorganisms are simultaneously employed. The first one which may be endomycopsis fibuliger opens up the starch while a yeast of the saccharomyces or of the candida type converts the mono- or disaccharides into yeast.

Preferably the protein containing starches and cellulose material are first subjected to a hydrolysis of the starch and subsequently to an ultrafiltration and aerobic fermentation. The hydrolysis of the starch may be carried out with a diluted acid for instance hydrochloric acid, sulfuric acid or phosphoric acid.

The hydrolysis may also be carried out with just one enzyme. The hydrolysis may for instance be effected with an enzyme generating microorganism which then is separated out prior to the ultrafiltration. On the other hand it is also possible to separate the microorganism itself from the product of the hydrolysis by ultrafiltration.

The filtrate coming out of the untrafiltration step may then be subjected to the aerobic. However, the ultrafiltration may also be effected subsequent to the hydrolysis and aerobic fermentation.

It should be understood that the sugar-starch mixture which remains after extraction of the fat may be subjected also directly to an enzymatic degradation with amylases followed by an isomerization step as further described below in Example 3.

The starch residue may for instance by hydrolyzed in a first step whereupon it may then be subjected to enzymatic degradation conjointly with the sugar solution until glucose is obtained which latter may then be subjected to an isomerization.

Following the fat extraction the protein and other undesired material may be separated.

The isomerose obtained of equal parts of glucose and fructose may be further purified by ultrafiltration. It is, however, also possible to effect the entire isomerization subsequent to the ultrafiltration.

The isomerization accordingly may be effected after separating by precipitation the protein and the salts that may be present. However, the isomerization can also be effected prior to such separation.

The removal of the salts, particularly sodium chloride, preferably is effected in an ion exchanger.

For the purpose of the isomerization it is preferred to subject the material to a prior removal of the sodium chloride, but then to add, for the purpose of the isomerization, magnesium chloride which thus replaces the sodium chloride. Prior to final use the magnesium chloride is then removed in an ion exchanger It is also possible to remove all salts employed including the added magnesium chloride in one single step in the ion exchanger.

The following examples will further illustrate the invention.

EXAMPLE 1

In this example a bakery product which had been obtained in the production of biscuits was processed. The fat found in the waste from this product was extracted in conventional manner with solvents like petrol ether and hexane. The hexane is the preferable solvent which was used in this example. The mixture with the solvent was effected in the tank 4. The extraction was carried out at a temperature of 25° C during 2 hours in the filter-extractor 5. The temperature could also have been anywhere between 20° and 50° C and the extraction may have been carried out at a time anywhere between 1 and 3 hours.

The amount employed of hexane was 2.5 liter but the general range would be between 2 and 3 liters, per kg of bakery waste.

The fat-containing solution was separated from the solid residue by filtration following the extraction in the filter-extractor 5. The solvent was subsequently separated from the fat by a fractionation indicated at 6. The yield in fat relative to the original bakery waste was 12 to 15%.

The recovered solvent 8 was then recycled and employed for a further extraction in the mixing tank 4 and extractor 5.

The fat-free residue was mixed with 3 liters of water per 1 kg of bakery waste. The general range would be 3 to 5 liter water in this step. Thus, a suspension was formed from which, by means of passage through an ultrafilter, sugar and salt were separated. The ultrafiltrate now contained the sugar and salt. The total sugar contents of the filtrate was 12 to 15% relative to the original bakery waste. The concentration of sugar in the solution of the filtrate was 4 to 5% sugar and 0.4 to 0.5% salt.

The filtrate was then subjected to a fermentation. The fermentation conditions were 37° C at a pH of 3.5. The general range which could have been employed was 30 to 40° C at a pH of 3 to 5.

The microorganisms employed were of the genus saccharomyces, preferably *S. cerevisiae, S. carlsbergensis* and *S. ludwigii*.

As nutritive salts were added, per liter of substrate, 3.5 g $KH_2PO_4$, 0.7 g $(NH_4)_2SO_4$ and 0.35 g $MgSO.$ $7H_2O$. The aeration was effected at a rate of 1.2 vvm (the range could have been between 0.5 and 1.5 vvm).

The fermentation resulted in a yeast containing 45 to 48% crude protein. The yield of yeast was 6 to 7.5% relative to the original bakery waste.

The concentrate remaining after ultra filtration contained between 65 and 70% solids of which 6 to 7% were protein and 50 to 60% were starch. All these percentage figures relate to the original bakery waste. The entire concentrate was then subjected to drying in a roller-or spray dryer. In the present case the preferred dryer employed was a spray dryer. This part of the product was then ready for reuse in food products.

EXAMPLE 2

The separation of the fats in this case was effected as described in Example 1. The residue which remained after the removal of the fats was then subjected to an extraction in the same filter extractor 5 with different alcohols. The filter extracter was provided for this purpose with a centrifugal purification filter of the type sold under the trademark "Funda".

The alcohol employed was a 70% ethanol; isopropanol or methanol could also be used. For each kg of fat-free residue, 2 l of ethanol were added and the extraction was carried out during at time of 1.5 hours (a range between 1 and 2 hours could be employed). The residue was then removed and again mixed with 1 liter 70% ethanol and the final residue was separated from the solution by repeated filtration and eventually was washed with one half l of 70% ethanol.

The residue remaining after the alcohol extraction were subjected to an air current to remove any alcohol residue. They were subsequently subjected to drying in conventional manner whereby a high value protein-starch product was obtained.

The alcoholic phase of this step which contained the entire amount of sugar was passed through a valve 10' into the separator 10 where the alcohol was distilled off in conventional manner. The now remaining aqueous sugar solution was then mixed with an aliquot part of water and passed into a cation-anion column exchanger. The cation exchanger compound was of the type LeWatit S100 while the anion exchanger was LeWatit MP62.

The salt-free sugar solution was then cocentrated by evaporation to a syrup.

EXAMPLE 3

1 kg of bakery waste containing between 15 and 20% fats and 15 and 20% sugars was extracted with hexane and then subjected to drying. The residue containing about 800 to 880 g of carbohydrates was then stirred with 0.2% alpha-amylase at a pH of 6.5 into 5 l of water at 75° C during a period of 1 hour. In this step there was added $CaCl_2$ salt. The carbohydrates thus became liquefied except for the proteins. There were then added 0.15% of amidoglucosidase after adjusting the pH with hydrochloric acid to a value between 3.5 and 4. $CaCl_2$ was present in the solution in a sufficient amount.

After leaving the solution for between about 12 and 24 hours at 60° C the mass was then heated to 100 to 120° C under pressure. The preferred temperature actually employed was 120° C. This step caused the original proteins to precipitate. The proteins were then removed by centrifuging.

The remaining solution was then stirred at a pH of between 7 and 8.5 with glucose isomerase. Thus, after a period of between 3 and 10 hours, about 50% of the glucose had been converted to fructose. Instead of stirring, the solution could also have been pumped through a column. Prior to the isomerization the $CaCl_2$ and the other calcium salts had been precipitated with carbonate and replaced for the purpose of the isomerization with $MgCl_2$.

The filtrated solution could now be concentrated by evaporation in a vacuum. There were received about 600 to 800 g of an isomerose syrup, depending on the type of initial product. The isomerose essentially consisted of equal parts of glucose and fructose.

This syrup could then be purified by passing through an ion exchanger. However, this is a step not definitely necessary if the syrup is passed back into the bakery.

Preferably, the enzymes are destroyed prior to bleaching in a heat treatment or they are filtered out by ultrafiltration.

Thus, the sugar-starch mixture could also be converted to an isomerose syrup in this manner, and after the necessary purification by means of an activated charcoal or an ion exchanger or both, the syrup could then by recycled into the bakery production.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for separately recovering or converting for reuse the fats, sugar, protein and starch from wastes occurring in the making of bakery products and containing these components, the said process comprising 1. subjecting the comminuted waste product to a first extraction filtration with a liquid fat solvent, removing the filtered-out fat solution, recovering the fat and recycling the solvent;
2. then subjecting the degreased product to a second extraction-filtration step in the same extraction-filtration zone with an aqueous or alcoholic sugar solvent, followed by removing the filtered-out sugar solution from said suspension and recovering the sugar therefrom; and
3. thereafter withdrawing the filter residue from said extraction-filtration zone and subjecting it to an acidic or enzymatic hydrolysis and aerobic fermentation with a yeast, subjecting the product to purification and concentration and then drying the concentrate so as to recover a solids product in the form of crude protein and yeast for reuse in food products.

2. The process of claim 1 wherein in case of an alcoholic extraction at 2 the alcohol is distilled off from the alcoholic sugar solution and is recycled into said alcoholic extraction while the remaining aqueous solution is passed through an ion exchanger to remove any salt that may be present in the sugar solution.

3. The process of claim 1 wherein any solvent left in the extraction-filtration residue is recovered by steam extraction.

4. The process of claim 1 wherein the sugar is recovered in the case of a water extraction at 2 by passing the said suspension solution through an ultrafilter.

5. The process of claim 1 wherein any protein present in the sugar solution extracted in step 2 is separated by a heat and pressure treatment followed by centrifuging of the remaining solution.

6. The process of claim 1 wherein any calcium salts that may be present in the sugar solution are removed by precipitation and replaced by magnesium chloride for subsequent isomerization.

* * * * *